United States Patent
Liu (10) Patent No.: US 10,152,382 B2
(45) Date of Patent: Dec. 11, 2018

(54) METHOD AND SYSTEM FOR MONITORING VIRTUAL MACHINE CLUSTER

(71) Applicant: BEIJING BAIDU NETCOM SCIENCE AND TECHNOLOGY, LTD., Beijing (CN)

(72) Inventor: Hu Liu, Beijing (CN)

(73) Assignee: BEIJING BAIDU NETCOM SCIENCE AND TECHNOLOGY, CO., LTD., Beijing (CN)

( * ) Notice: Subject to any disclaimer, the term of this patent is extended or adjusted under 35 U.S.C. 154(b) by 120 days.

(21) Appl. No.: 15/239,612

(22) Filed: Aug. 17, 2016

(65) Prior Publication Data

US 2017/0116084 A1    Apr. 27, 2017

(30) Foreign Application Priority Data

Oct. 26, 2015   (CN) .......................... 2015 1 0703270

(51) Int. Cl.
*G06F 11/00*        (2006.01)
*G06F 11/14*        (2006.01)

(52) U.S. Cl.
CPC .... *G06F 11/1438* (2013.01); *G06F 2201/805* (2013.01); *G06F 2201/815* (2013.01); *G06F 2201/85* (2013.01)

(58) Field of Classification Search
CPC ................................................... G06F 11/1438
See application file for complete search history.

(56) References Cited

U.S. PATENT DOCUMENTS

| 8,880,774 B2 * | 11/2014 | Schmidt ................ G06F 11/203 711/6 |
| 8,924,967 B2 * | 12/2014 | Nelson ................ G06F 9/45533 709/224 |
| 2007/0174836 A1 | 7/2007 | Ito et al. |
| 2011/0225582 A1 | 9/2011 | Iikura et al. |

(Continued)

FOREIGN PATENT DOCUMENTS

| CN | 103152419 A | 6/2013 |
| JP | 2007-329345 A | 12/2007 |

(Continued)

*Primary Examiner* — Christopher S McCarthy
(74) *Attorney, Agent, or Firm* — Marshall, Gerstein & Borun LLP (57) ABSTRACT

A method and system for monitoring a virtual machine cluster comprising sending, by physical machine, state parameter query instruction to a virtual machine in the virtual machine cluster at a first preset time interval; sending response information to the physical machine in response to receiving the query; the physical machine determining that the virtual machine is faulty, in response to the response information beyond a second preset time, judging whether the faulty machine satisfies a restart condition, and sending a restart instruction to a second machine on which the faulty machine runs, if the faulty machine satisfies the restart condition, by the virtual machine; and restarting, the second physical machine, the faulty virtual machine according to the restart instruction. The disclosure can be used to monitor virtual machines and recover a faulty virtual machine, thereby improving the availability of the virtual machine cluster and shortening service intervals.

18 Claims, 7 Drawing Sheets

(56) References Cited

U.S. PATENT DOCUMENTS

| | | | | |
|---|---|---|---|---|
| 2012/0030670 A1* | 2/2012 | Vijay | ................... | G06F 9/45558 |
| | | | | 718/1 |
| 2012/0254284 A1 | 10/2012 | Tamura | | |
| 2015/0242236 A1 | 8/2015 | Nakazono | | |
| 2015/0278046 A1* | 10/2015 | Zellermayer | ....... | G06F 11/1438 |
| | | | | 714/4.11 |
| 2016/0216992 A1* | 7/2016 | Vavrick | ............... | G06F 11/0793 |

FOREIGN PATENT DOCUMENTS

| | | |
|---|---|---|
| JP | 2011-186783 A | 9/2011 |
| JP | 2015/148843 A | 8/2015 |
| JP | 2015-158773 A | 9/2015 |

\* cited by examiner

METHOD AND SYSTEM FOR MONITORING VIRTUAL MACHINE CLUSTER

CROSS-REFERENCE TO RELATED APPLICATION

This application is related to and claims priority from Chinese Application No. 201510703270.3, filed on Oct. 26, 2015, entitled "METHOD AND SYSTEM FOR MONITORING VIRTUAL MACHINE CLUSTER", the entire disclosure of which is hereby incorporated by reference.

TECHNICAL FIELD

The present application relates to the field of computer technology, specifically to the field of computer network technology, and more specifically to a method and system for monitoring a virtual machine cluster.

BACKGROUND

Currently, with the rapid development of the Internet, virtualization and big data processing are attracting increasingly more attention in the industry. The combination of the two technologies becomes a trendy contemporary research direction in the industry. A big data processing solution may be deployed and running in a virtual environment to greatly improve the system resource utilization rate and the configuration flexibility. However, compared with a physical environment, the virtual environment has greater uncertainty, therefore the high availability of the system becomes ever more important.

In the prior art, in order to maintain the high availability of a virtual system, a physical host machine of the virtual machine will usually be monitored to determine whether the host machine is faulty.

However, when using the above-mentioned method for monitoring the physical host machine of the virtual machine, and the host machine is faulty, all virtual machines on the physical host machine need to be manually repaired by operation and maintenance personnel, thereby wasting a relatively long time, resulting in long service suspension and bringing loss to users.

SUMMARY

One of the purposes of the present application is to provide a method and system for monitoring a virtual machine cluster, in order to solve the technical problems mentioned in the background.

In a first aspect, the present application provides a method for monitoring a virtual machine cluster. The method includes: sending, by a first physical machine, a virtual machine state parameter query instruction to a virtual machine in the virtual machine cluster at a first preset time interval; sending response information to the first physical machine by the virtual machine in response to receiving the query instruction; determining that the virtual machine is faulty, in response to the response information beyond a second preset time, judging whether the faulty virtual machine satisfies a preset restart condition, and sending a virtual machine restart instruction to a second physical machine on which the faulty virtual machine runs, if the faulty virtual machine satisfies the preset restart condition, by the first physical machine; and restarting, by the second physical machine, the faulty virtual machine according to the virtual machine restart instruction.

In a second aspect, the present application provides a system for monitoring a virtual machine cluster. The system includes a first physical machine, a virtual machine, and a second physical machine, the first physical machine configured to send a virtual machine state parameter query instruction to the virtual machine in the virtual machine cluster at a first preset time interval, determine that the virtual machine is faulty, in response to response information beyond a second preset time, judge whether the faulty virtual machine satisfies a preset restart condition, and send a virtual machine restart instruction to the second physical machine on which the faulty virtual machine runs, if the faulty virtual machine satisfies the preset restart condition; the virtual machine configured to send the response information to the first physical machine in response to receiving the query instruction; and the second physical machine configured to restart the faulty virtual machine according to the virtual machine restart instruction.

According to the method and system for monitoring the virtual machine cluster provided in the present disclosure, a first physical machine sends a virtual machine state parameter query instruction to a virtual machine in the virtual machine cluster at a first preset time interval; the virtual machine sends response information to the first physical machine in response to receiving the query instruction; the first physical machine determines that the virtual machine is faulty, in response to the response information beyond a second preset time, judges whether the faulty virtual machine satisfies a preset restart condition, and sends a virtual machine restart instruction to a second physical machine on which the faulty virtual machine runs, if the faulty virtual machine satisfies the preset restart condition; and the second physical machine restarts the faulty virtual machine according to the virtual machine restart instruction. The method and system can be used for monitoring virtual machines and automatically recovering a faulty virtual machine, thereby improving the availability of the virtual machine cluster and shortening the service suspension period.

BRIEF DESCRIPTION OF THE DRAWINGS

By reading the following detailed description of nonrestrictive embodiments with reference to the accompanying drawings, other features, purposes and advantages of the present application will become more apparent.

DETAILED DESCRIPTION

The present application will be further described below in detail in combination with the accompanying drawings and embodiments. It can be understood that, the specific embodiments described herein are merely used for explaining the relevant invention, rather than limiting the present invention. In addition, it should be noted that, for the convenience of description, only the parts related to the relevant invention are shown in the accompanying drawings.

It should also be noted that, the embodiments in the present application and the features in the embodiments can be combined with each other on a no conflict basis. The present application will be illustrated below in detail with reference to the accompanying drawings and in combination with the embodiments.

Figure 1:
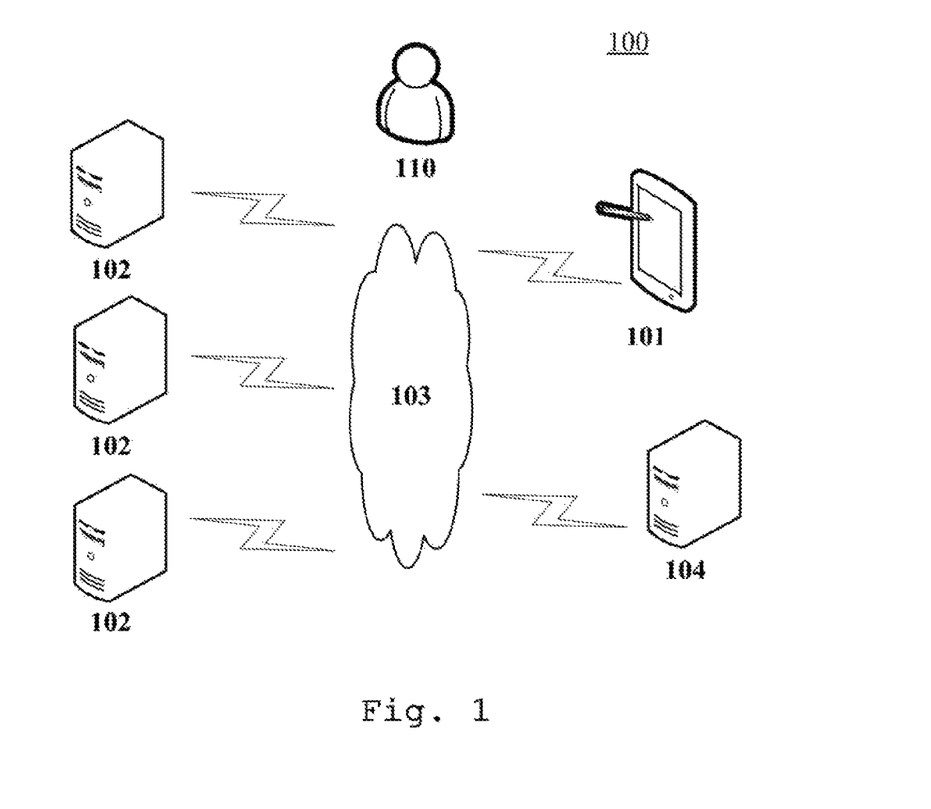
FIG. 1 is an exemplary system architecture diagram to which the present application may be applied.

FIG. 1 shows an exemplary system architecture 100 capable of applying a method for monitoring a virtual machine cluster according to an embodiment of the present application.

As shown in FIG. 1, the system architecture 100 may include a terminal device 101, a server cluster 102 provided with the virtual machine cluster and a server 104 provided with no virtual machine. A network 103 is used for providing a communication link medium among the terminal device 101, the server cluster 102 and the server 104. The network 103 may include a variety of connection types, such as wired and wireless communication links or an optical fiber cable.

A user 110 may use the terminal device 101 to interact with the server 104 through the network 103 to submit a user job, and the server 104 may interact with the server cluster 102 through the network 103 to submit the job submitted by the user to the virtual machine cluster running on the server cluster 102. A variety of client applications may be installed on the terminal device 101, for example, a web browser application, a search application, an instant messaging tool, an email client, social platform software, and a cloud platform application.

The terminal device 101 may be various kinds of electronic devices, which have man-machine interaction modules and support job submission, including, but not limited to, mobile smart terminals, tablet computers, laptop computers, desktop computers, multimedia players and electronic readers.

The server cluster 102 may comprise a plurality of servers providing data analysis processing, and the virtual machine cluster comprising a large number of virtual machines may operate on the server cluster. Specifically, the virtual machines in the virtual machine cluster may be divided into two categories: management nodes and computing nodes. The management node is responsible for the management and resource scheduling of the entire cluster and the management of the job submitted by the user, and the computing node is mainly responsible for executing the computing of a specific sub-task.

The server 104 may be a server providing the data analysis processing and may also be a server cluster comprising a plurality of servers. For example, a server for performing analysis processing on the user job submitted by the terminal device 101. The server 104 may analyze and process operation data provided by the virtual machine cluster running on the server cluster 102, in order to allocate the user job submitted by the terminal device 101 to the management node in the virtual machine cluster running on the server cluster 102. The management node allocates the submitted user job to the computing node in the virtual machine cluster, then the management node obtains a data analysis processing result of the computing node on the submitted user job and returns the processing result to the server 104, and the server 104 returns the data analysis and processing result of the submitted user job to the terminal device 101.

It should be noted that, the operation steps of the method for monitoring the virtual machine cluster provided by the embodiment of the present application are generally executed by the server cluster 102, the virtual machine cluster running on the server cluster 102 and the server 104, and the operation steps of submitting the user job to the server 104 are generally executed by the terminal device 101.

It should be appreciated that the numbers of the terminal devices, the networks and the servers in FIG. 1 are merely schematic. Any number of terminal devices, networks and servers may be arranged based on demands.

Figure 2:
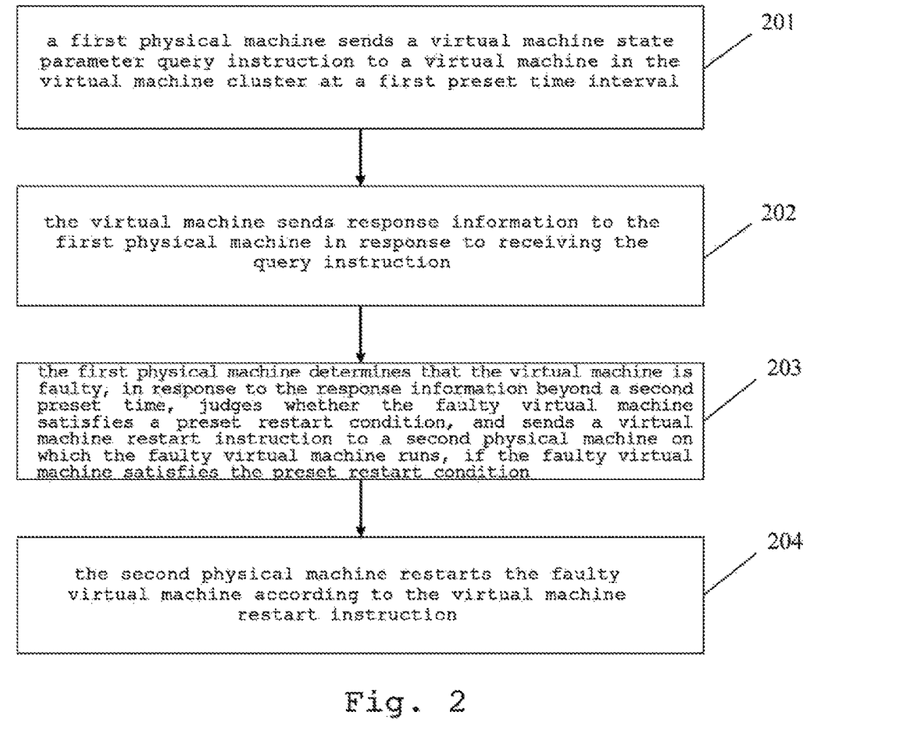
FIG. 2 shows a schematic flowchart of a method for monitoring a virtual machine cluster according to an embodiment of the present application.

Referring to FIG. 2, a schematic flowchart 200 of a method for monitoring a virtual machine cluster is shown according to an embodiment of the present application. The method 200 for monitoring the virtual machine cluster includes the following steps.

In step 201, a first physical machine sends a virtual machine state parameter query instruction to a virtual machine in the virtual machine cluster at a first preset time interval.

In the embodiment, the first physical machine refers to a physical machine provided with no virtual machine, for example, the server 104 in FIG. 1. The virtual machine cluster may cluster a plurality of virtual machines to provide an identical service together, just like only one virtual machine when seen from the client. One or more virtual machines may be deployed on a computer, the virtual machines deployed on a plurality of computers form the virtual machine cluster, and the virtual machines in the virtual machine cluster may simultaneously carry out concurrent computation to achieve a very high computing speed.

The first preset time interval is a time interval of the query instructions sent from the first physical machine to the virtual machine, and may be set in comprehensive consideration of parameters of the physical machine, network parameters, parameters of the virtual machine, the system resource utilization rate of the virtual machine and the system configuration flexibility of the virtual machine, etc.

The above-mentioned query instruction may be an instruction of polling the health state of virtual machines, for example, an instruction of querying one or more of the following state parameters of a virtual machine: the disk utilization rate of a virtual machine, the network I/O load of a virtual machine and the CPU utilization rate of a virtual machine, etc.

In step 202, the virtual machine sends response information to the first physical machine in response to receiving the query instruction.

In the embodiment, after receiving the query instruction sent by the first physical machine, the virtual machine sends the response information to the first physical machine through a service process running on the virtual machine.

In step 203, the first physical machine determines that the virtual machine is faulty, in response to the response information beyond a second preset time, judges whether the faulty virtual machine satisfies a preset restart condition, and sends a virtual machine restart instruction to a second physical machine on which the faulty virtual machine runs, if the faulty virtual machine satisfies the preset restart condition.

In the embodiment, the second preset time is preset in the first physical machine. The second preset time is an allowable response time interval of the response information during the normal operation. If the response information is delayed beyond the second preset time, it is determined that the virtual machine is faulty.

If the faulty virtual machine satisfies the preset restart condition, that is, the faulty virtual machine influences the operating efficiency of the virtual machine cluster but satisfy a repair attempt condition, the virtual machine restart instruction may be sent to the second physical machine on which the faulty virtual machine runs. For example, in an alternative implementation, if a ratio of the faulty virtual machines is smaller than a preset ratio, the virtual machine restart instruction may be sent to the second physical machine. In another alternative implementation, if an interval from a preceding virtual machine restart or reconstruction of the faulty virtual machine exceeds a third preset time, the virtual machine restart instruction may be sent to the second physical machine. The ratio of the faulty virtual machines refers to the ratio of the faulty virtual machines to the quantity of all the virtual machines in the virtual machine cluster.

In step 204, the second physical machine restarts the faulty virtual machine according to the virtual machine restart instruction.

After the first physical machine sends the virtual machine restart instruction to the second physical machine, the second physical machine restarts the faulty virtual machine according to the received virtual machine restart instruction.

In some alternative implementations, after restarting the faulty virtual machine, the second physical machine may also restart a service process of the virtual machine. For example, the second physical machine sends a restart response signal to the first physical machine, when restarting the faulty virtual machine; the first physical machine obtains an address of the faulty virtual machine from pre-recorded meta-information of virtual machines in response to receiving the restart response signal, connects to the restarted virtual machine according to the address, and sends a first service process restart signal to the restarted virtual machine; and the restarted virtual machine starts a service process of the restarted virtual machine according to the first service process restart signal. The first service process is a service process running on the restarted virtual machine.

In a specific application scenario of the embodiment, the method for monitoring the virtual machine cluster may further include: deploying a monitoring process on the first physical machine out of the virtual machine cluster, while directly deploying an proxy process in the virtual machine. The monitoring process and the proxy process in the virtual machine communicate with each other by periodically sending heartbeat information. When the heartbeat is interrupted, the monitoring process deems that the virtual machine where the proxy process is located is in an unhealthy state. When the duration of the unhealthy state of the virtual machine exceeds a specified time threshold, it is determined that the virtual machine is faulty. When the virtual machine is in a faulty state, the recovery rule of the virtual machine is as follows: the faulty state of the virtual machines in the entire cluster is detected first; if there are a large number of faulty virtual machines in the cluster, it is deemed that the virtual network is faulty; and a large number of faulty operations will be generated if the faulty virtual machines are recovered at this time. Therefore, in this state, it is feasible not to recover the virtual machines, but to wait for the network fault repair. Moreover, to avoid an excessive pressure on the system caused by frequent recoveries, if a virtual machine to be recovered was recovered within a certain time period, the virtual machine will not be recovered again, so as to control the traffic of recovering virtual machines and reduce the pressure on the system.

According to the method for monitoring the virtual machine cluster according to the embodiment of the present application, each virtual machine on the physical machine is individually monitored, such that error-disable and fault in the virtual machine level can be found. Moreover, the condition of the virtual machine cluster is determined to prevent a faulty operation caused by network faults. In addition, the recovery frequency of the virtual machine is also controlled to prevent the system from pressure.

Figure 3:
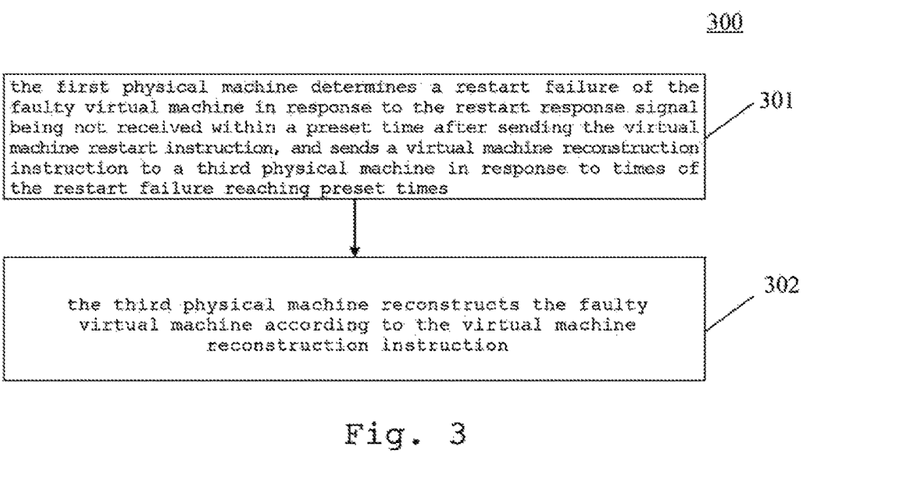
FIG. 3 shows another schematic flowchart of a method for monitoring a virtual machine cluster according to an embodiment of the present application.

FIG. 3 shows a schematic flowchart 300 of a method for monitoring a virtual machine cluster based on FIG. 2 according to an embodiment of the present application.

On the basis of the method for monitoring the virtual machine cluster in FIG. 2, the method 300 for monitoring the virtual machine cluster may further include the following steps.

In step 301, the first physical machine determines a restart failure of the faulty virtual machine in response to the restart response signal being not received within a preset time after sending the virtual machine restart instruction, and sends a virtual machine reconstruction instruction to a third physical machine in response to times of the restart failure reaching preset times.

In the embodiment, the third physical machine is a physical machine, except for the second physical machine, in a host physical machine cluster of the virtual machine cluster.

In step 302, the third physical machine reconstructs the faulty virtual machine according to the virtual machine reconstruction instruction.

It can be seen from FIG. 3 that, compared with the embodiment corresponding to FIG. 2, the process 300 of the method for monitoring the virtual machine cluster in this embodiment emphasizes that the first physical machine sends the virtual machine reconstruction instruction and the third physical machine reconstructs the faulty virtual machine according to the virtual machine reconstruction instruction. Therefore, the solution described in this embodiment may introduce reconstructing a faulty virtual machine. If the first physical machine does not receive a restart response signal within a preset time after sending the virtual machine restart instruction, the first physical machine may send the virtual machine reconstruction instruction to the third physical machine to reconstruct the faulty virtual machine.

Figure 4:
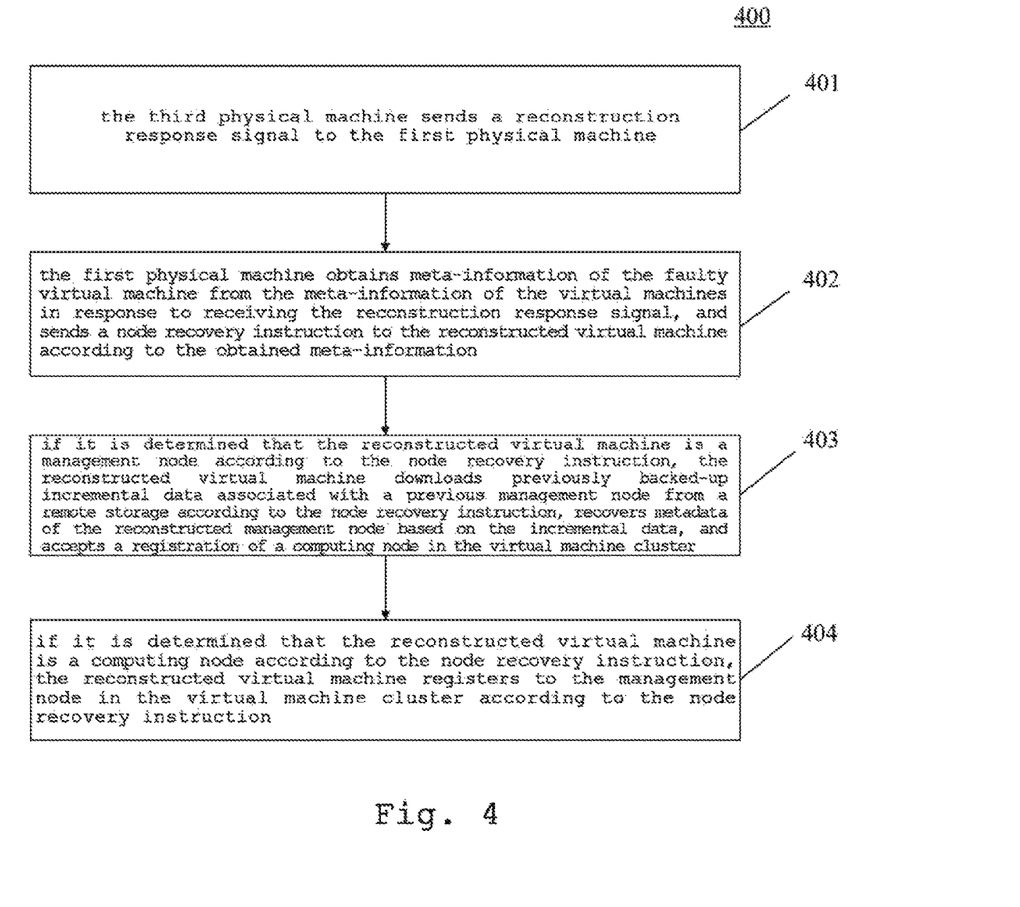
FIG. 4 shows a third schematic flowchart of a method for monitoring a virtual machine cluster according to an embodiment of the present application.

FIG. 4 shows a schematic flowchart 400 of a method for monitoring a virtual machine cluster based on FIG. 3 according to an embodiment of the present application.

On the basis of the method for monitoring the virtual machine cluster in FIG. 3, the method 400 for monitoring the virtual machine cluster may further include the following steps.

In step 401, the third physical machine sends a reconstruction response signal to the first physical machine.

In the embodiment, after reconstructing the virtual machine according to the received virtual machine reconstruction instruction, the third physical machine may send the reconstruction response signal to the first physical machine, in order to notify the first physical machine of the accomplishment of a virtual machine reconstruction event.

In step 402, the first physical machine obtains meta-information of the faulty virtual machine from the meta-information of the virtual machines in response to receiving the reconstruction response signal, and sends a node recovery instruction to the reconstructed virtual machine according to the obtained meta-information.

In the embodiment, after determining that the third physical machine accomplishes the virtual machine reconstruction event according to the received reconstruction response signal, the first physical machine queries the meta-information of the faulty virtual machine from the meta-information of the virtual machines pre-recorded in the first physical machine according to the address of the faulty virtual machine, generates the node recovery instruction according to the type of the virtual machine node indicated by the meta-information of the faulty virtual machine, and sends the node recovery instruction to the reconstructed virtual machine according to the address of the faulty virtual machine. The address of the reconstructed virtual machine is identical to that of the faulty virtual machine. The node recovery instruction includes the type of the virtual machine node, and is suitable for the type of the virtual machine node.

In step 403, if it is determined that the reconstructed virtual machine is a management node according to the node recovery instruction, the reconstructed virtual machine downloads previously backed-up incremental data associated with a previous management node from a remote storage according to the node recovery instruction, recovers metadata of the reconstructed management node based on the incremental data, and accepts a registration of a computing node in the virtual machine cluster.

In the embodiment, if the type of the virtual machine node in the node recovery instruction is the management node, the reconstructed virtual machine downloads previously backed-up incremental data associated with a previous management node from a remote storage according to the node recovery instruction first, recovers metadata of the reconstructed management node based on the incremental data, and then accepts a registration of a computing node in the virtual machine cluster.

In an alternative implementation, to facilitate the first physical machine to monitor the reconstructed virtual machine, the method for monitoring the virtual machine cluster may further include: the reconstructed management node determining reconstruction success and sending a reconstruction success indication signal to the first physical machine in response to a ratio of computing nodes in the virtual machine cluster registered within a preset time being larger than or equal to a preset ratio, and sending a reconstruction failure indication alarm signal to the first physical machine in response to the ratio of computing nodes in the virtual machine cluster registered within the preset time being smaller than the preset ratio; and the first physical machine submitting a received user job to the reconstructed management node according to the reconstruction success indication signal, and displaying an alarm prompt according to the reconstruction failure indication alarm signal.

Figure 5A:
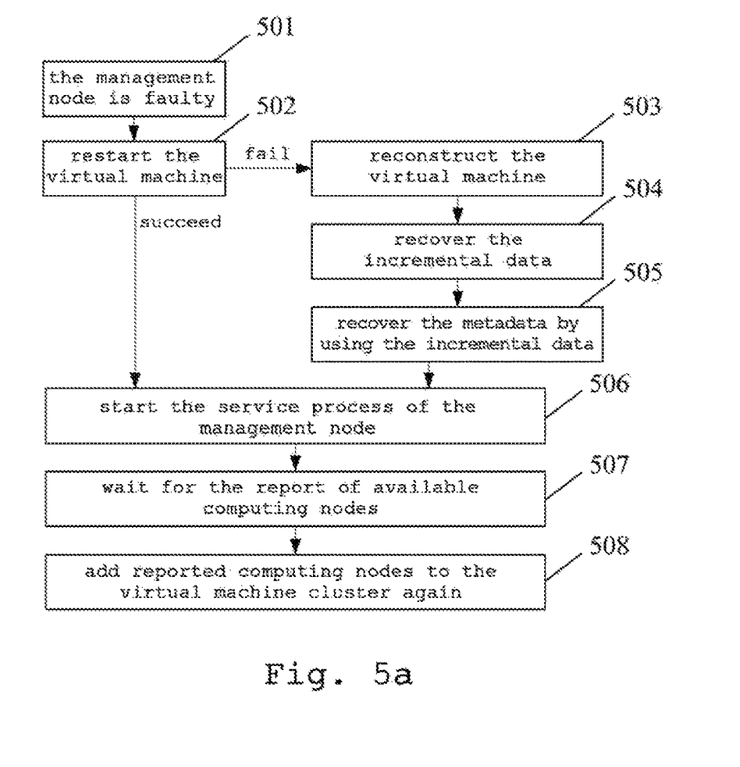
FIG. 5a shows a schematic diagram of a recovery flow when a virtual machine according to an embodiment of the present application is a management node.

In a specific application scenario of the embodiment as shown in FIG. 5a, FIG. 5a shows a schematic flowchart of recovery when the virtual machine is the management node according to the embodiment of the present application.

In FIG. 5a, the process of recovering the management node includes the following steps.

In step 501, the faulty virtual machine is determined as the management node.

In step 502, the management node restarts the virtual machine at the management node according to the received virtual machine restart instruction, and continues to restart a business service process on the virtual node in the case that the restart of the virtual machine is success.

In step 503, in the case of restart failure, the management node continues to attempt. If the attempt fails several times, it can be determined that the host physical machine where the virtual machine is located is faulty. If the host physical machine is faulty, the first physical machine is prompted by an alarm. Then, another host machine attempts to reconstruct the disabled virtual node on itself according to the received reconstruction instruction from the first physical machine.

In step 504, after being reconstructed successfully, the management node recovers the meta-information of the incremental backup from the remote storage.

In step 505, the management node recovers the data on itself by using the meta-information of the incremental backup.

In step 506, the management node starts the service process.

In step 507, the management node waits for registration of computing nodes.

In step 508, the management node adds registered computing nodes to a computing cluster again.

Returning to FIG. 4, in step 404, if it is determined that the reconstructed virtual machine is a computing node according to the node recovery instruction, the reconstructed virtual machine registers to the management node in the virtual machine cluster according to the node recovery instruction.

In the embodiment, if the type of the virtual machine node to be recovered by using the node recovery instruction is the computing node, the reconstructed virtual machine registers to the management node in the virtual machine cluster according to the node recovery instruction.

Figure 5B:
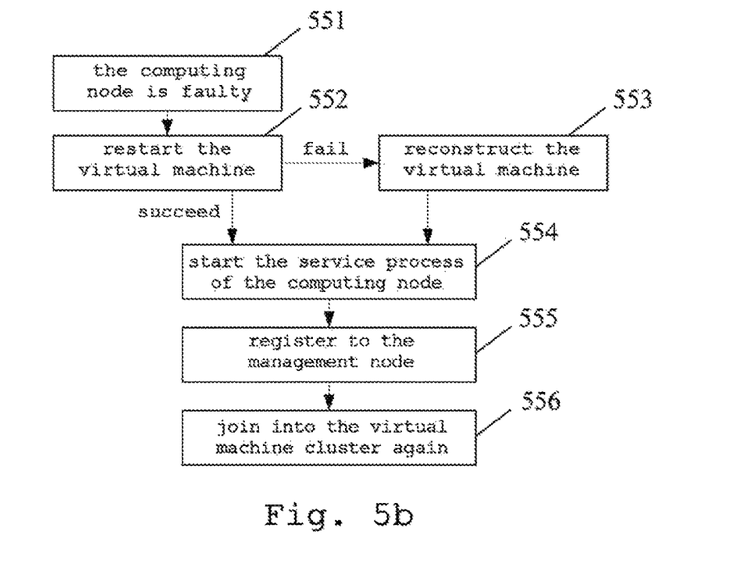
FIG. 5b shows a schematic diagram of a recovery flow when a virtual machine according to an embodiment of the present application is a computing node.

In a specific application scenario of the embodiment as shown in FIG. 5b, FIG. 5b shows a schematic flowchart of recovery when the virtual machine is a computing node according to the embodiment of the present application.

In FIG. 5b, the process of recovering the computing node includes the following steps.

In step 551, the faulty virtual machine is determined as a computing node.

In step 552, the physical machine where the computing node is located restarts the virtual machine at the computing node according to the received virtual machine restart instruction, and starts to recover the service process of the computing node in the case that the virtual machine at the computing node is restarted successfully.

In step 553, in the case of restart failure, the computing node attempts several times. If the attempt always fails, the first physical machine is prompted by an alarm. After receiving the virtual machine reconstruction instruction from the first physical machine, another physical machine reconstructs the virtual computing node on itself.

In step 554, the computing node starts a service process of the computing node.

In step 555, the computing node registers to the management node in the computing node cluster.

In step 556, the computing node joins into the virtual computing cluster again.

Returning to FIG. 4, it can be seen from FIG. 4 with reference to the embodiment of FIG. 3 that the process 400 of the method for monitoring the virtual machine cluster in the embodiment emphasizes the step of the reconstructed virtual machine recovering the node according to the node recovery instruction. Therefore, the solution described in this embodiment can introduce the recovery of the virtual machine node, and the management node and the computing node are recovered by respective steps different from each other according to the node recovery instruction, so as to recover the management node or the computing node.

Figure 6:
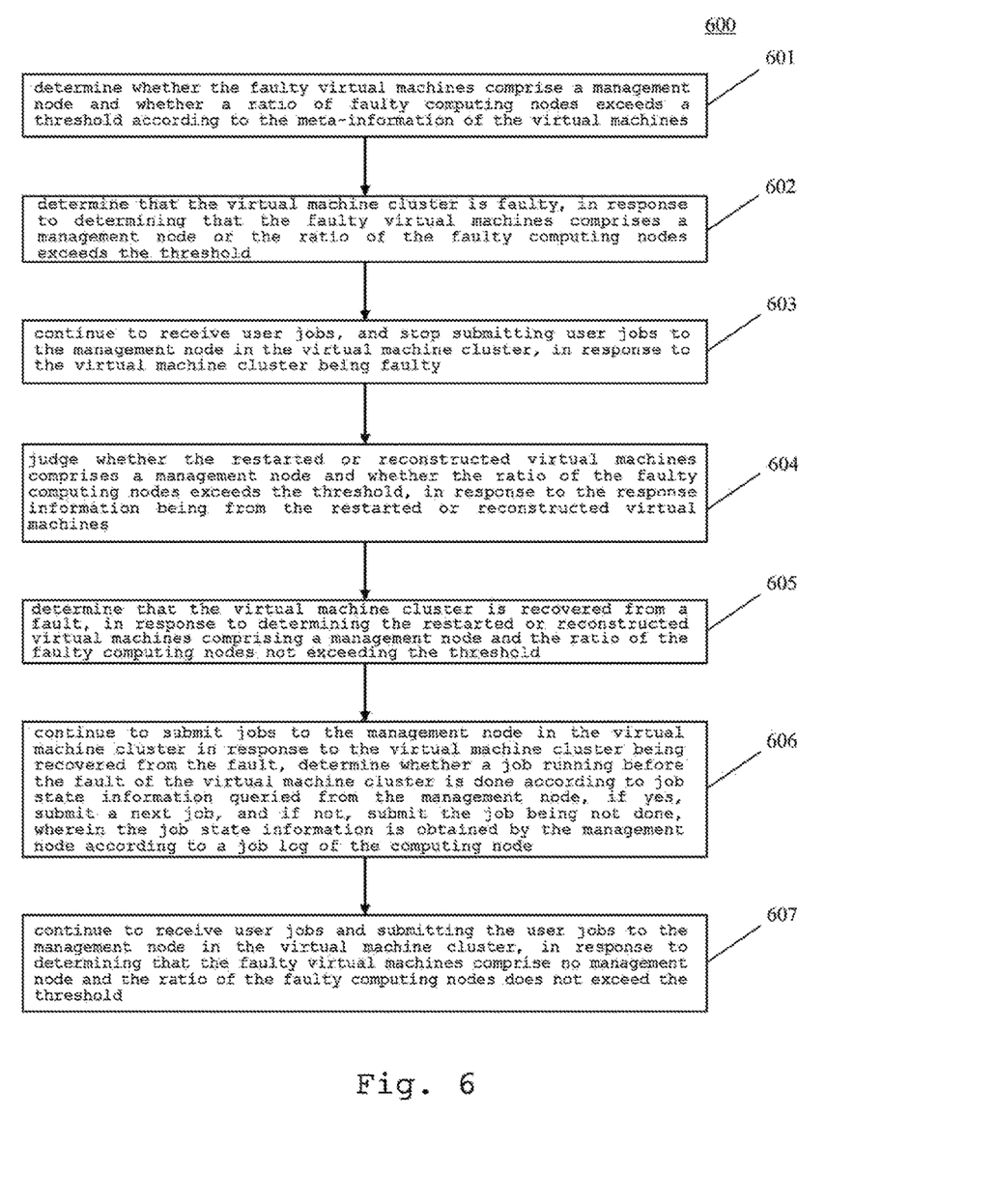
FIG. 6 shows a fourth schematic flowchart of a method for monitoring a virtual machine cluster according to an embodiment of the present application.

FIG. 6 shows a schematic flowchart 600 of a method for monitoring a virtual machine cluster based on FIG. 4 according to an embodiment of the present application. On the basis of the method for monitoring the virtual machine cluster in FIG. 4, the method 600 for monitoring the virtual machine cluster further includes the following steps.

Step 601 is to determine whether the faulty virtual machines comprise a management node and whether a ratio of faulty computing nodes exceeds a threshold according to the meta-information of the virtual machines.

In the embodiment, according to the meta-information of the virtual machines pre-recorded in the first physical machine, it can be determined whether the faulty virtual machine node is a management node or a computing node, and whether a ratio of the faulty computing nodes exceeds a threshold in the case that the faulty virtual machine node is a computing node.

Step 602 is to determine that the virtual machine cluster is faulty, in response to determining that the faulty virtual machines comprises a management node or the ratio the faulty computing nodes exceeds the threshold.

In the embodiment, if it is determined that the faulty virtual machines comprise a management node in the step 601, it can be also determined that the virtual machine cluster is faulty since the service processes in the computing nodes cannot be monitored with a faulty management node. Alternatively, if it is determined that the ratio of the faulty computing nodes exceeds the threshold in the step 601, a large number of virtual machines in the virtual machine cluster are faulty to influence the data processing capability of the computing nodes, and it can be also determined that the virtual machine cluster is faulty.

Step 603 is to continue to receive user jobs, and stop submitting user jobs to the management node in the virtual machine cluster, in response to the virtual machine cluster being faulty.

In the embodiment, when the virtual machine cluster is faulty, the first physical machine may continue to receive user jobs, but stop submitting user jobs to the management node in the virtual machine cluster, since the first physical machine and the virtual machine cluster are separate from each other.

Step 604 is to judge whether the restarted or reconstructed virtual machines comprises a management node and whether the ratio of the faulty computing nodes exceeds the threshold, in response to the response information being from the restarted or reconstructed virtual machines.

In the embodiment, when the response information is from the restarted or reconstructed virtual machines, it can be determined whether the restarted or reconstructed virtual machines comprise a management node and whether the ratio of the faulty computing nodes exceeds the threshold. The source of the response information can be determined at least according to the addresses of the virtual machines sending the response information.

Step 605 is to determine that the virtual machine cluster is recovered from a fault, in response to determining the restarted or reconstructed virtual machines comprising a management node and the ratio of the faulty computing nodes not exceeding the threshold.

In the embodiment, when it is determined that the restarted or reconstructed virtual machines comprise a management node and the ratio of the faulty computing nodes does not exceed the threshold, it can be determined that the virtual machine cluster is recovered from the fault, that is, the virtual machine cluster has had the capability of receiving and processing user jobs.

Step 606 is to continue to submit jobs to the management node in the virtual machine cluster in response to the virtual machine cluster being recovered from the fault, determine whether a job running before the fault of the virtual machine cluster is done according to job state information queried from the management node, if yes, submit a next job, and if not, submit the job being not done.

In the embodiment, when the virtual machine cluster is recovered from the fault, the first physical machine submits the received user jobs to the management node in the virtual machine cluster and determines whether a job running before the fault of the virtual machine cluster is done according to job state information queried from the management node. If yes, the first physical machine submits a next job. If not, the first physical machine submits the job being not done. The job state information is obtained by the management node according to a job log of the computing node.

Step 607 is to continue to receive user jobs and submitting the user jobs to the management node in the virtual machine cluster, in response to determining that the faulty virtual machines comprise no management node and the ratio of the faulty computing nodes does not exceed the threshold.

In the embodiment, in response to determining that the faulty virtual machines comprise no management node and the ratio of the faulty computing nodes does not exceed the threshold, the first physical machine determines that the operating state of the virtual machine cluster is normal, continues to receive user jobs, and submits the user jobs to the management node in the virtual machine cluster.

In some alternative implementations, the method for monitoring the virtual machine cluster may further include: the management node in the virtual machine cluster periodically backing up incremental operation logs into the remote storage; and the remote storage periodically merging the backed-up operation logs and deleting the operation logs prior to a merging time.

Figure 7:
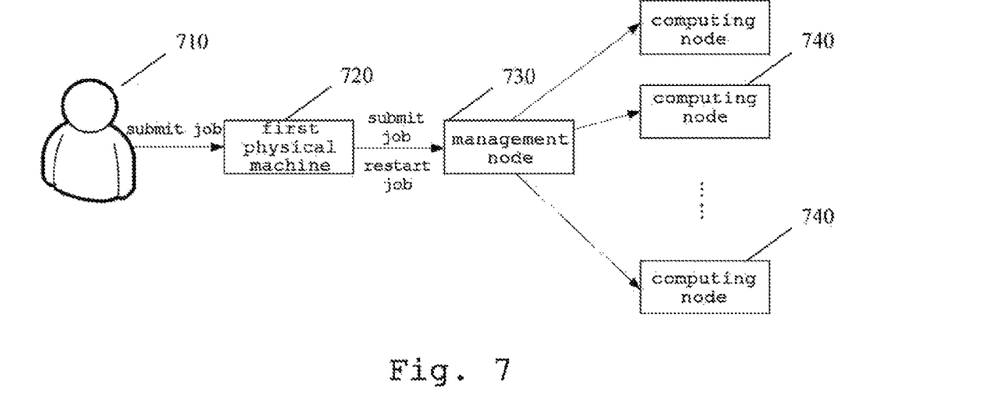
FIG. 7 shows a flowchart for submitting a job by a user by applying the method for monitoring a virtual machine cluster according to an embodiment of the present application.

In a specific application scenario of the embodiment as shown in FIG. 7, FIG. 7 shows a flowchart of submitting a job by a user with the method for monitoring a virtual machine cluster according to an embodiment of the present application.

In FIG. 7, a job management process is deployed on the first physical machine 720 out of the virtual machine cluster to manage and schedule user jobs on the virtual machine cluster. The user 710 initially submits a job to the job management process on the first physical machine 720, and then the job management process submits a specific job to the management node 730 in the virtual computing cluster. When a virtual node is faulty, the job is continued to be accepted and submitted to the virtual computing cluster if the faulty node is a computing node 740 and the ratio of faulty computing nodes 740 is smaller than a certain threshold. If the faulty node is the management node 730 or the quantity of the faulty computing nodes 740 is larger than a certain threshold, the virtual computing cluster is deemed to be faulty, the job management process continues to accept task jobs, but stops submitting jobs to the computing cluster. Meanwhile, the state of the virtual cluster is checked at a certain time interval. When the management node 730 is recovered and the quantity of normal computing nodes 740 is larger than a certain threshold, the job management process continues to submit jobs to the virtual cluster. The job management process records the jobs which have been submitted and are running. When the virtual cluster is recovered from the fault, the job management process detects the jobs that were previously running in the virtual cluster. If a previously running job fails, the job is submitted again. If a previously running job succeeds, the next job is submitted.

Returning to FIG. 6, it can be seen from FIG. 6 with reference to the embodiment of FIG. 4 that the process 600 of the method for monitoring the virtual machine cluster in the embodiment emphasizes the step of separating the job management process from the virtual machine cluster to manage jobs submitted by the user. Therefore, the solution described in the embodiment can introduce the job management process, so that the user jobs still can be received, and the job failing to be executed due to the fault of the virtual node or cluster can be submitted again, in the case that the virtual machine is faulty. Therefore, the capability of managing user jobs is enhanced.

Figure 8:
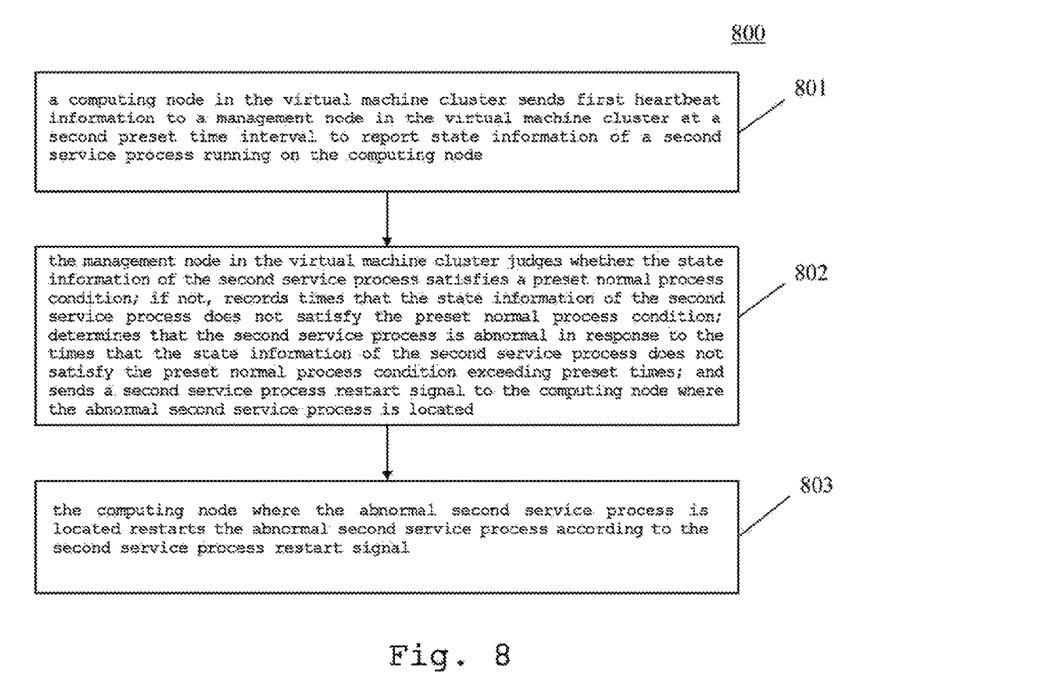
FIG. 8 shows a fifth schematic flowchart of a method for monitoring a virtual machine cluster according to an embodiment of the present application.

FIG. 8 shows a schematic flowchart 800 of a method for monitoring a virtual machine cluster based on FIG. 6 according to an embodiment of the present application. On the basis of the method for monitoring the virtual machine cluster in FIG. 6, the method 800 for monitoring the virtual machine cluster may further include the following steps.

In step 801, a computing node in the virtual machine cluster sends first heartbeat information to a management node in the virtual machine cluster at a second preset time interval to report state information of a second service process running on the computing node.

In the embodiment, the second preset time interval is a preset time interval of sending the first heartbeat information from the computing node to the management node, and the second service process is a service process runs on the computing node.

In step 802, the management node in the virtual machine cluster judges whether the state information of the second service process satisfies a preset normal process condition; if not, records times that the state information of the second service process does not satisfy the preset normal process condition; determines that the second service process is abnormal in response to the times that the state information of the second service process does not satisfy the preset normal process condition exceeding preset times; and sends a second service process restart signal to the computing node where the abnormal second service process is located.

In the embodiment, in the step 801, after the computing node sends first heartbeat information to a management node to report state information of a second service process running on the computing node, the management node judges whether the state information of the second service process is normal. If not, the management node records the times of abnormality. When the times of abnormality reach a certain number, the management node determines that the second service process is abnormal, and notifies a proxy process to restart related business processes to recover the service.

In step 803, the computing node where the abnormal second service process is located restarts the abnormal second service process according to the second service process restart signal.

In some alternative implementations, the computing node in the virtual machine cluster sends second heartbeat information to the management node in the virtual machine cluster to report virtual machine state parameter information; and the management node in the virtual machine cluster judges whether the virtual machine state parameter information satisfies a preset abnormal condition. If yes, an alarm prompt is displayed so that the operation and maintenance personnel can quickly intervene to solve related problems and recover the computing nodes.

It can be seen from FIG. 8 with reference to the embodiment of FIG. 6 that the process 800 of the method for monitoring the virtual machine cluster in the embodiment emphasizes the step of monitoring and managing the second service process. Therefore, the solution described in the embodiment can introduce restarting the abnormal second service process, so that the abnormal second service process can be restarted to recover the service of the virtual machine when the second service process is abnormal.

Figure 9:
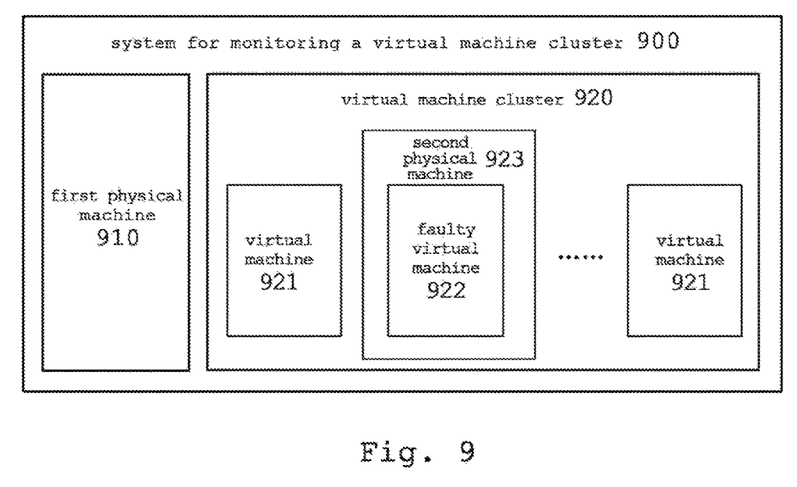
FIG. 9 shows an exemplary architecture diagram of a system for monitoring a virtual machine cluster according to an embodiment of the present application.

Referring to FIG. 9, as an implementation of the method shown in the above figures, the system of this embodiment corresponds to the method of the embodiment as shown in FIG. 2. FIG. 9 shows an exemplary architecture diagram of a system for monitoring a virtual machine cluster according to an embodiment of the present application.

As shown in FIG. 9, the system 900 for monitoring the virtual machine cluster includes: a first physical machine 910, a virtual machine cluster 920 and a physical machine cluster (not shown in their entirety) for operating the virtual machine cluster.

The first physical machine 910 is configured to send a virtual machine state parameter query instruction to the virtual machine in the virtual machine cluster at a first preset time interval, determine that the virtual machine is faulty, in response to response information beyond a second preset time, judge whether the faulty virtual machine satisfies a preset restart condition, and send a virtual machine restart instruction to the second physical machine on which the faulty virtual machine runs, if the faulty virtual machine satisfies the preset restart condition.

The virtual machine cluster 920 includes a virtual machine 921 configured to send the response information to the first physical machine in response to receiving the query instruction.

The physical machine cluster includes the second physical machine 923 that operates the faulty virtual machine 922. The second physical machine 923 is configured to restart the faulty virtual machine according to the virtual machine restart instruction.

In some alternative implementations, the second physical machine is further configured to send a restart response signal to the first physical machine, when restarting the faulty virtual machine, the restarted virtual machine starting a service process of the restarted virtual machine according to a first service process restart signal; and the first physical machine is further configured to obtain an address of the faulty virtual machine from pre-recorded meta-information of virtual machines, in response to receiving the restart response signal, connect to the restarted virtual machine according to the address, and send the first service process restart signal to the restarted virtual machine.

Corresponding to the method of the embodiment as shown in FIG. 3, in some alternative implementations, the system further includes: a third physical machine configured to reconstruct the faulty virtual machine according to a virtual machine reconstruction instruction; wherein the first physical machine is further configured to determine a restart failure of the faulty virtual machine in response to the restart response signal being not received within a preset time after sending the virtual machine restart instruction, and send the virtual machine reconstruction instruction to the third physical machine in response to times of the restart failure reaching preset times, and wherein the third physical machine is a physical machine, except for the second physical machine, in a host physical machine cluster of the virtual machine cluster.

Corresponding to the method of the embodiment as shown in FIG. 4, in some alternative implementations, the third physical machine is further configured to send a reconstruction response signal to the first physical machine; the reconstructed virtual machine downloads previously backed-up incremental data associated with a previous management node from a remote storage according to a node recovery instruction, if it is determined that the reconstructed virtual machine is a management node according to the node recovery instruction; recovers metadata of the reconstructed management node based on the incremental data; accepts a registration of a computing node in the virtual machine cluster; and registers to the management node in the virtual machine cluster according to the node recovery instruction, if it is determined that the reconstructed virtual machine is a computing node according to the node recovery instruction; and the first physical machine is further configured to obtain meta-information of the faulty virtual machine from the meta-information of the virtual machines in response to receiving the reconstruction response signal, and send the node recovery instruction to the reconstructed virtual machine according to the obtained meta-information.

In some alternative implementations, the reconstructed management node is further configured to determine reconstruction success and send a reconstruction success indication signal to the first physical machine in response to a ratio of computing nodes in the virtual machine cluster registered within a preset time being larger than or equal to a preset ratio, and send a reconstruction failure indication alarm signal to the first physical machine in response to the ratio of computing nodes in the virtual machine cluster registered within the preset time being smaller than the preset ratio; and the first physical machine is further configured to submit a received user job to the reconstructed management node according to the reconstruction success indication signal, and display an alarm prompt according to the reconstruction failure indication alarm signal.

Corresponding to the method of the embodiment as shown in FIG. 6, in some alternative implementations, the first physical machine is further configured to: determine whether the faulty virtual machines comprises a management node and whether a ratio of faulty computing nodes exceeds a threshold according to the meta-information of the virtual machines; determine that the virtual machine cluster is faulty, in response to determining that the faulty virtual machines comprises a management node or the ratio the faulty computing nodes exceeds the threshold; continue to receive user jobs, and stop submitting user jobs to the management node in the virtual machine cluster, in response to the virtual machine cluster being faulty; judge whether the restarted or reconstructed virtual machines comprises a management node and whether the ratio of the faulty computing nodes exceeds the threshold, in response to the response information being from the restarted or reconstructed virtual machines; determine that the virtual machine cluster is recovered from a fault, in response to determining the restarted or reconstructed virtual machines comprising a management node and the ratio of the faulty computing nodes not exceeding the threshold; continue to submit jobs to the management node in the virtual machine cluster, in response to the virtual machine cluster being recovered from the fault, determine whether a job running before the fault of the virtual machine cluster is done according to job state information queried from the management node, if yes, submit a next job, and if not, submit the job being not done, wherein the job state information is obtained by the management node according to a job log of the computing node; and continue to receive user jobs and submitting the user jobs to the management node in the virtual machine cluster, in response to determining that the faulty virtual machines comprise no management node and the ratio of the faulty computing nodes does not exceed the threshold.

In some alternative implementations, the system further includes: a remote storage configured to periodically merge backed-up operation logs and delete the operation logs prior to a merging time; and the management node in the virtual machine cluster is further configured to periodically back up incremental operation logs into the remote storage.

In some alternative implementations, the computing node in the virtual machine cluster is further configured to send first heartbeat information to a management node in the virtual machine cluster at a second preset time interval to report state information of a second service process running on the computing node, the computing node where the abnormal second service process is located restarts the abnormal second service process according to the second service process restart signal; and the management node in the virtual machine cluster is further configured to judge whether the state information of the second service process satisfies a preset normal process condition; if not, record times that the state information of the second service process does not satisfy the preset normal process condition; determine that the second service process is abnormal in response to the times that the state information of the second service process does not satisfy the preset normal process condition exceeding preset times; and send a second service process restart signal to the computing node where the abnormal second service process is located.

In some alternative implementations, the computing node in the virtual machine cluster is further configured to send second heartbeat information to the management node in the virtual machine cluster to report virtual machine state parameter information; and the management node in the virtual machine cluster is further configured to judge whether the virtual machine state parameter information satisfy a preset abnormal condition, and if yes, display an alarm prompt.

The system for monitoring the virtual machine cluster provided in the above embodiments of the present application can be used for monitoring virtual machines, and may automatically recover a virtual machine and a service running on the virtual machine when the virtual machine is faulty, so that the availability of the virtual machine cluster is improved, and the service suspension period is shortened.

Those skilled in the art can understand that, each of the above nodes may further include some other known structures, for example, processors and memories. In order to avoid unnecessarily obscuring the embodiments in the present disclosure, these known structures are not shown in FIG. 9.

Figure 10:
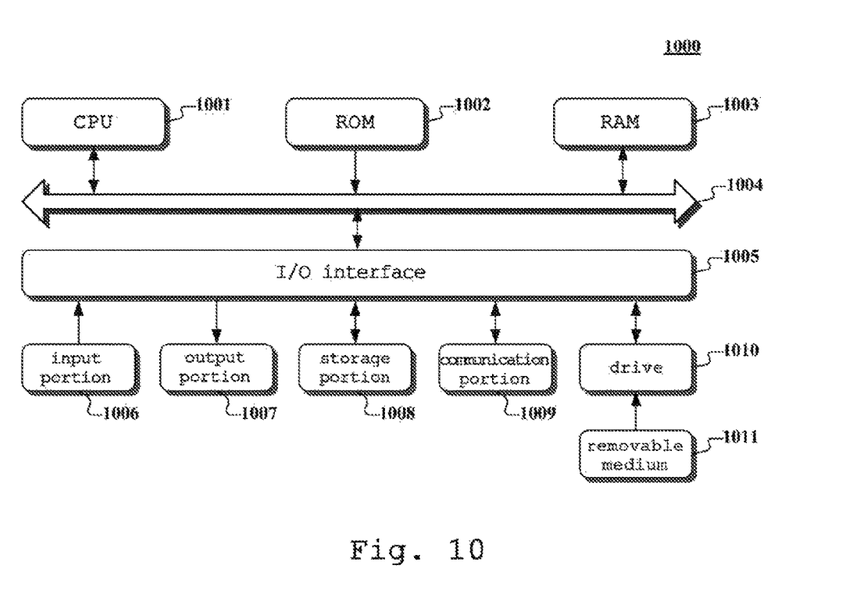
FIG. 10 shows a schematic diagram of a structure of a computer system in a terminal device or a server suitable for implementing an embodiment of the present application.

Referring to FIG. 10, a schematic structural diagram of a computer system 1000 adapted to implement a server of the embodiments of the present application is shown.

As shown in FIG. 10, the computer system 1000 includes a central processing unit (CPU) 1001, which may execute various appropriate actions and processes in accordance with a program stored in a read-only memory (ROM) 1002 or a program loaded into a random access memory (RAM) 1003 from a storage portion 1008. The RAM 1003 also stores various programs and data required by operations of the system 1000. The CPU 1001, the ROM 1002 and the RAM 1003 are connected to each other through a bus 1004. An input/output (I/O) interface 1005 is also connected to the bus 1004.

The following components are connected to the I/O interface 1005: an input portion 1006 including a keyboard, a mouse etc.; an output portion 1007 comprising a cathode ray tube (CRT), a liquid crystal display device (LCD), a speaker etc.; a storage portion 1008 including a hard disk and the like; and a communication portion 1009 comprising a network interface card, such as a LAN card and a modem. The communication portion 1009 performs communication processes via a network, such as the Internet. A drive 1010 is also connected to the I/O interface 1005 as needed. A removable medium 1011, such as a magnetic disk, an optical disk, a magneto-optical disk, and a semiconductor memory, may be placed on the drive 1010, to enable the retrieval of a computer program from the removable medium 1011, and the installation thereof on the storage portion 1008 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 1009, and/or may be installed from the removable media 1011.

The flow charts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. When the one or more programs are executed by a device, the device is to: send, by a first physical machine, a virtual machine state parameter query instruction to a virtual machine in the virtual machine cluster at a first preset time interval; send, by the virtual machine, response information to the first physical machine in response to receiving the query instruction; determine, by the first physical machine, that the virtual machine is faulty, in response to the response information beyond a second preset time; judge, by the first physical machine, whether the faulty virtual machine satisfies a preset restart condition; send, by the first physical machine, a virtual machine restart instruction to a second physical machine on which the faulty virtual machine runs, if the faulty virtual machine satisfies the preset restart condition; and restart, by the second physical machine, the faulty virtual machine according to the virtual machine restart instruction.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for monitoring a virtual machine cluster, comprising:

sending, by a first physical machine, a virtual machine state parameter query instruction to a virtual machine in the virtual machine cluster at a first preset time interval;

sending, by the virtual machine, response information to the first physical machine in response to receiving the query instruction;

determining, by the first physical machine, that the virtual machine is faulty, in response to the response information beyond a second preset time, judging, by the first physical machine, whether the faulty virtual machine satisfies a preset restart condition, and sending, by the first physical machine, a virtual machine restart instruction to a second physical machine on which the faulty virtual machine runs, if the faulty virtual machine satisfies the preset restart condition;

restarting, by the second physical machine, the faulty virtual machine according to the virtual machine restart instruction;

sending, by the second physical machine, a restart response signal to the first physical machine, when restarting the faulty virtual machine;

obtaining, by the first physical machine, an address of the faulty virtual machine from pre-recorded meta-information of virtual machines in response to receiving the restart response signal, connecting, by the first physical machine, to the restarted virtual machine according to the address, and sending, by the first physical machine, a first service process restart signal to the restarted virtual machine; and starting, by the restarted virtual machine, a service process of the restarted virtual machine according to the first service process restart signal.

2. The method according to claim 1, wherein the sending of a virtual machine restart instruction to a second physical machine on which the faulty virtual machine runs, if the faulty virtual machine satisfies the preset restart condition, comprises:

sending the virtual machine restart instruction to the second physical machine, if a ratio of the faulty virtual machines is smaller than a preset ratio; or sending the virtual machine restart instruction to the second physical machine, if an interval from a preceding virtual machine restart or reconstruction of the faulty virtual machine exceeds a third preset time.

3. The method according to claim 1, further comprising:

determining, by the first physical machine, a restart failure of the faulty virtual machine in response to the restart response signal being not received within a preset time after sending the virtual machine restart instruction, and sending, by the first physical machine, a virtual machine reconstruction instruction to a third physical machine in response to times of the restart failure reaching preset times, wherein the third physical machine is a physical machine, except for the second physical machine, in a host physical machine cluster of the virtual machine cluster; and reconstructing, by the third physical machine, the faulty virtual machine according to the virtual machine reconstruction instruction.

4. The method according to claim 3, further comprising:

sending, by the third physical machine, a reconstruction response signal to the first physical machine;

obtaining, by the first physical machine, meta-information of the faulty virtual machine from the meta-information of the virtual machines in response to receiving the reconstruction response signal, and sending, by the first physical machine, a node recovery instruction to the reconstructed virtual machine according to the obtained meta-information; and downloading, by the reconstructed virtual machine, previously backed-up incremental data associated with a previous management node from a remote storage according to the node recovery instruction, if it is determined that the reconstructed virtual machine is a management node according to the node recovery instruction; recovering, by the reconstructed virtual machine, metadata of the reconstructed management node based on the incremental data; accepting, by the reconstructed virtual machine, a registration of a computing node in the virtual machine cluster; and registering, by the reconstructed virtual machine, to the management node in the virtual machine cluster according to the node recovery instruction, if it is determined that the reconstructed virtual machine is a computing node according to the node recovery instruction.

5. The method according to claim 4, further comprising:

determining reconstruction success and sending a reconstruction success indication signal, by the reconstructed management node, to the first physical machine in response to a ratio of computing nodes in the virtual machine cluster registered within a preset time being larger than or equal to a preset ratio, and sending, by the reconstructed management node, a reconstruction failure indication alarm signal to the first physical machine in response to the ratio of computing nodes in the virtual machine cluster registered within the preset time being smaller than the preset ratio; and submitting, by the first physical machine, a received user job to the reconstructed management node according to the reconstruction success indication signal, and displaying, by the first physical machine, an alarm prompt according to the reconstruction failure indication alarm signal.

6. The method according to claim 5, further comprising: executing the following operations by using the first physical machine:

determining whether the faulty virtual machines comprise a management node and whether a ratio of faulty computing nodes exceeds a threshold according to the meta-information of the virtual machines;

determining that the virtual machine cluster is faulty, in response to determining that the faulty virtual machines comprises a management node or the ratio the faulty computing nodes exceeds the threshold;

continuing to receive user jobs, and stopping submitting user jobs to the management node in the virtual machine cluster, in response to the virtual machine cluster being faulty;

judging whether the restarted or reconstructed virtual machines comprise a management node and whether the ratio of the faulty computing nodes exceeds the threshold, in response to the response information being from the restarted or reconstructed virtual machines;

determining that the virtual machine cluster is recovered from a fault, in response to determining the restarted or reconstructed virtual machines comprising a management node and the ratio of the faulty computing nodes not exceeding the threshold;

continuing to submit jobs to the management node in the virtual machine cluster, in response to the virtual machine cluster being recovered from the fault, determining whether a job running before the fault of the virtual machine cluster is incomplete according to job state information queried from the management node, if yes, submitting a next job, and if not, submitting the incomplete job, wherein the job state information is obtained by the management node according to a job log of the computing node; and continuing to receive user jobs and submitting the user jobs to the management node in the virtual machine cluster, in response to determining that the faulty virtual machines comprise no management node and the ratio of the faulty computing nodes does not exceed the threshold.

7. The method according to claim 6, further comprising:

periodically backing up, by the management node in the virtual machine cluster, incremental operation logs into the remote storage; and periodically merging, by the remote storage, the backed-up operation logs and deleting, by the remote storage, the operation logs prior to a merging time.

8. The method according to claim 1, further comprising:

sending, by a computing node in the virtual machine cluster, first heartbeat information to a management node in the virtual machine cluster at a second preset time interval to report state information of a second service process running on the computing node;

judging, by the management node in the virtual machine cluster, whether the state information of the second service process satisfies a preset normal process condition; if not, recording, by the management node in the virtual machine cluster, times that the state information of the second service process does not satisfy the preset normal process condition; determining, by the management node in the virtual machine cluster, that the second service process is abnormal in response to the times that the state information of the second service process does not satisfy the preset normal process condition exceeding preset times; and sending, by the management node in the virtual machine cluster, a second service process restart signal to the computing node where the abnormal second service process is located; and restarting, by the computing node where the abnormal second service process is located, the abnormal second service process according to the second service process restart signal.

9. The method according to claim 8, further comprising:
sending, by the computing node in the virtual machine cluster, second heartbeat information to the management node in the virtual machine cluster to report virtual machine state parameter information; and judging, by the management node in the virtual machine cluster, whether the virtual machine state parameter information satisfies a preset abnormal condition, and if yes, displaying, by the management node in the virtual machine cluster, an alarm prompt.

10. The method according to claim 9, wherein the virtual machine state parameter information comprises one or more of: a disk utilization rate of the virtual machine, a network I/O load of the virtual machine and a CPU utilization rate of the virtual machine.

11. A system for monitoring a virtual machine cluster, comprising a first physical machine, a virtual machine and a second physical machine, the first physical machine configured to send a virtual machine state parameter query instruction to the virtual machine in the virtual machine cluster at a first preset time interval, determine that the virtual machine is faulty, in response to response information beyond a second preset time, judge whether the faulty virtual machine satisfies a preset restart condition, and send a virtual machine restart instruction to the second physical machine on which the faulty virtual machine runs, if the faulty virtual machine satisfies the preset restart condition;

the virtual machine configured to send the response information to the first physical machine in response to receiving the query instruction; and the second physical machine configured to restart the faulty virtual machine according to the virtual machine restart instruction; wherein the second physical machine is further configured to send a restart response signal to the first physical machine, when restarting the faulty virtual machine, the restarted virtual machine starting a service process of the restarted virtual machine according to a first service process restart signal; and the first physical machine is further configured to obtain an address of the faulty virtual machine from pre-recorded meta-information of virtual machines, in response to receiving the restart response signal, connect to the restarted virtual machine according to the address, and send the first service process restart signal to the restarted virtual machine.

12. The system according to claim 11, further comprising:
a third physical machine configured to reconstruct the faulty virtual machine according to a virtual machine reconstruction instruction;

wherein the first physical machine is further configured to determine a restart failure of the faulty virtual machine in response to the restart response signal being not received within a preset time after sending the virtual machine restart instruction, and send the virtual machine reconstruction instruction to the third physical machine in response to times of the restart failure reaching preset times, and wherein the third physical machine is a physical machine, except for the second physical machine, in a host physical machine cluster of the virtual machine cluster.

13. The system according to claim 11, wherein
the third physical machine is further configured to send a reconstruction response signal to the first physical machine; the reconstructed virtual machine downloads previously backed-up incremental data associated with a previous management node from a remote storage according to a node recovery instruction, if it is determined that the reconstructed virtual machine is a management node according to the node recovery instruction; recovers metadata of the reconstructed management node based on the incremental data; accepts a registration of a computing node in the virtual machine cluster; and registers to the management node in the virtual machine cluster according to the node recovery instruction, if it is determined that the reconstructed virtual machine is a computing node according to the node recovery instruction; and the first physical machine is further configured to obtain meta-information of the faulty virtual machine from the meta-information of the virtual machines in response to receiving the reconstruction response signal, and send the node recovery instruction to the reconstructed virtual machine according to the obtained meta-information.

14. The system according to claim 13, wherein
the reconstructed management node is further configured to determine reconstruction success and send a reconstruction success indication signal to the first physical machine in response to a ratio of computing nodes in the virtual machine cluster registered within a preset time being larger than or equal to a preset ratio, and send a reconstruction failure indication alarm signal to the first physical machine in response to the ratio of computing nodes in the virtual machine cluster registered within the preset time being smaller than the preset ratio; and the first physical machine is further configured to submit a received user job to the reconstructed management node according to the reconstruction success indication signal, and display an alarm prompt according to the reconstruction failure indication alarm signal.

15. The system according to claim 14, wherein the first physical machine is further configured to:
determine whether the faulty virtual machines comprises a management node and whether a ratio of faulty computing nodes exceeds a threshold according to the meta-information of the virtual machines;

determine that the virtual machine cluster is faulty, in response to determining that the faulty virtual machines comprises a management node or the ratio the faulty computing nodes exceeds the threshold;

continue to receive user jobs, and stop submitting user jobs to the management node in the virtual machine cluster, in response to the virtual machine cluster being faulty;

judge whether the restarted or reconstructed virtual machines comprises a management node and whether the ratio of the faulty computing nodes exceeds the threshold, in response to the response information being from the restarted or reconstructed virtual machines;

determine that the virtual machine cluster is recovered from a fault, in response to determining the restarted or reconstructed virtual machines comprising a management node and the ratio of the faulty computing nodes not exceeding the threshold;

continue to submit jobs to the management node in the virtual machine cluster, in response to the virtual machine cluster being recovered from the fault, determine whether a job running before the fault of the virtual machine cluster is done according to job state information queried from the management node, if yes, submit a next job, and if not, submit the job being not done, wherein the job state information is obtained by the management node according to a job log of the computing node; and continue to receive user jobs and submitting the user jobs to the management node in the virtual machine cluster, in response to determining that the faulty virtual machines comprise no management node and the ratio of the faulty computing nodes does not exceed the threshold.

16. The system according to claim 15, further comprising:

a remote storage configured to periodically merge backed-up operation logs and delete the operation logs prior to a merging time; and the management node in the virtual machine cluster is further configured to periodically back up incremental operation logs into the remote storage.

17. The system according to claim 11, wherein the computing node in the virtual machine cluster is further configured to send first heartbeat information to a management node in the virtual machine cluster at a second preset time interval to report state information of a second service process running on the computing node, the computing node where the abnormal second service process is located restarts the abnormal second service process according to the second service process restart signal; and the management node in the virtual machine cluster is further configured to judge whether the state information of the second service process satisfies a preset normal process condition; if not, record times that the state information of the second service process does not satisfy the preset normal process condition; determine that the second service process is abnormal in response to the times that the state information of the second service process does not satisfy the preset normal process condition exceeding preset times; and send a second service process restart signal to the computing node where the abnormal second service process is located.

18. The system according to claim 17, wherein the computing node in the virtual machine cluster is further configured to send second heartbeat information to the management node in the virtual machine cluster to report virtual machine state parameter information; and the management node in the virtual machine cluster is further configured to judge whether the virtual machine state parameter information satisfy a preset abnormal condition, and if yes, display an alarm prompt.

* * * * *